US012560133B2

(12) United States Patent
Glemarec et al.

(10) Patent No.: US 12,560,133 B2
(45) Date of Patent: Feb. 24, 2026

(54) MULTIPLE-FLOW AIRCRAFT TURBINE ENGINE

(71) Applicants: SAFRAN AIRCRAFT ENGINES, Paris (FR); GENERAL ELECTRIC COMPANY, Schenectady, NY (US)

(72) Inventors: Guillaume Glemarec, Moissy-Cramayel (FR); Valentin Sébastien Simon Avoyne, Moissy-Cramayel (FR); Hélène Monique Orsi, Moissy-Cramayel (FR); Mathieu Marc Christian Gaillot, Moissy-Cramayel (FR)

(73) Assignees: SAFRAN AIRCRAFT ENGINES, Paris (FR); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/855,976

(22) PCT Filed: Apr. 15, 2022

(86) PCT No.: PCT/FR2022/050720
§ 371 (c)(1),
(2) Date: Oct. 10, 2024

(87) PCT Pub. No.: WO2023/198963
PCT Pub. Date: Oct. 19, 2023

(65) Prior Publication Data
US 2025/0243827 A1      Jul. 31, 2025

(51) Int. Cl.
*F04D 29/52*        (2006.01)
*F02K 3/077*        (2006.01)

(52) U.S. Cl.
CPC ............ *F02K 3/077* (2013.01); *F04D 29/522* (2013.01); *F05D 2240/128* (2013.01); *F05D 2240/14* (2013.01)

(58) Field of Classification Search
CPC ...... F02K 3/077; F04D 29/522; F04D 19/002; F04D 25/0673; F04D 25/166
See application file for complete search history.

(56) References Cited

U.S. PATENT DOCUMENTS

| | | | |
|---|---|---|---|
| 2019/0128189 A1 | 5/2019 | Rambo | |
| 2021/0108597 A1 | 4/2021 | Ostdiek et al. | |
| 2021/0310417 A1* | 10/2021 | Hrubec | F02C 7/36 |

FOREIGN PATENT DOCUMENTS

| | | |
|---|---|---|
| FR | 2981686 A1 | 4/2013 |
| FR | 3074476 A1 | 6/2019 |
| GB | 2100799 A | 1/1983 |

OTHER PUBLICATIONS

International Search Report mailed Dec. 7, 2022, issued in corresponding International Application No. PCT/FR2022/050720, filed Apr. 15, 2022, 5 pages.
Written Opinion mailed Jun. 28, 2023, issued in corresponding International Application No. PCT/FR2022/050720, filed Apr. 15, 2022, 10 pages.

* cited by examiner

*Primary Examiner* — Sabbir Hasan
(74) *Attorney, Agent, or Firm* — Christensen O'Connor Johnson Kindness PLLC

(57) ABSTRACT

A multi-flow turbine engine for an aircraft, the turbine engine having a gas generator with geometrical characteristics allowing it to have at its periphery a cold compartment larger than its hot compartment.

7 Claims, 5 Drawing Sheets

[Fig.1]
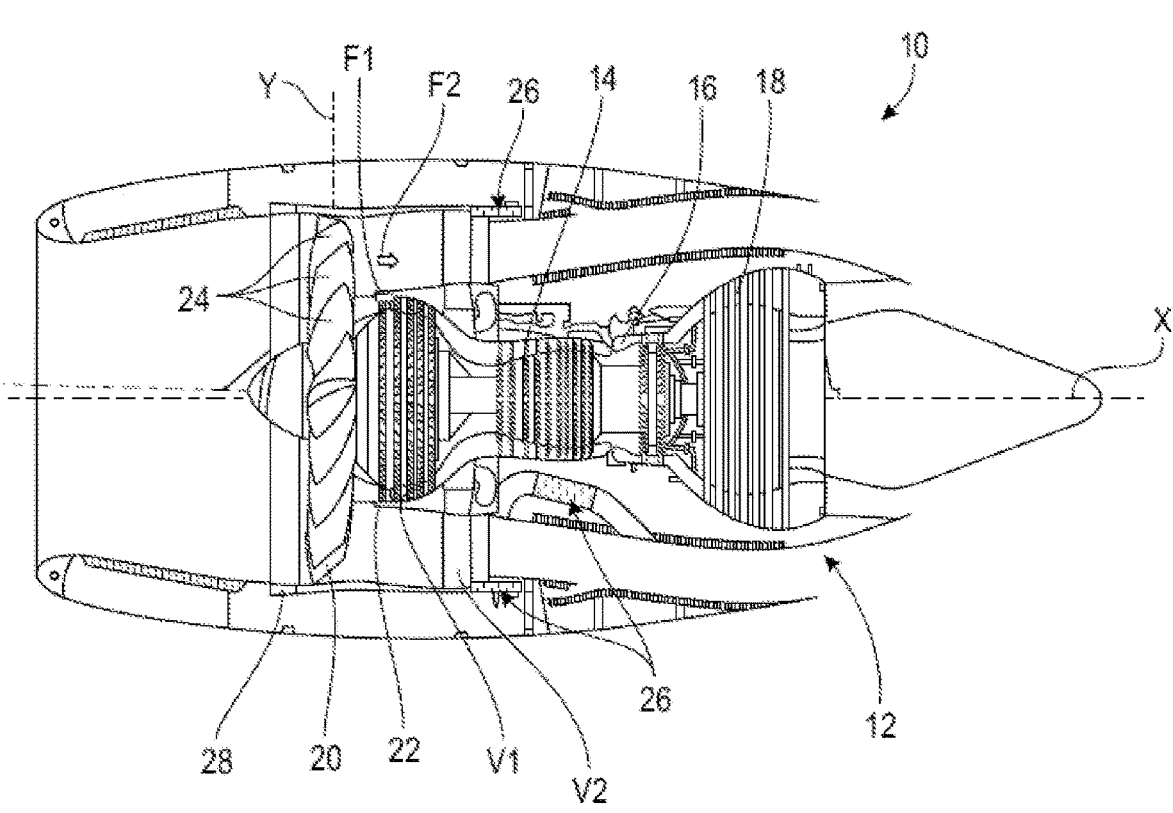

[Fig.2]
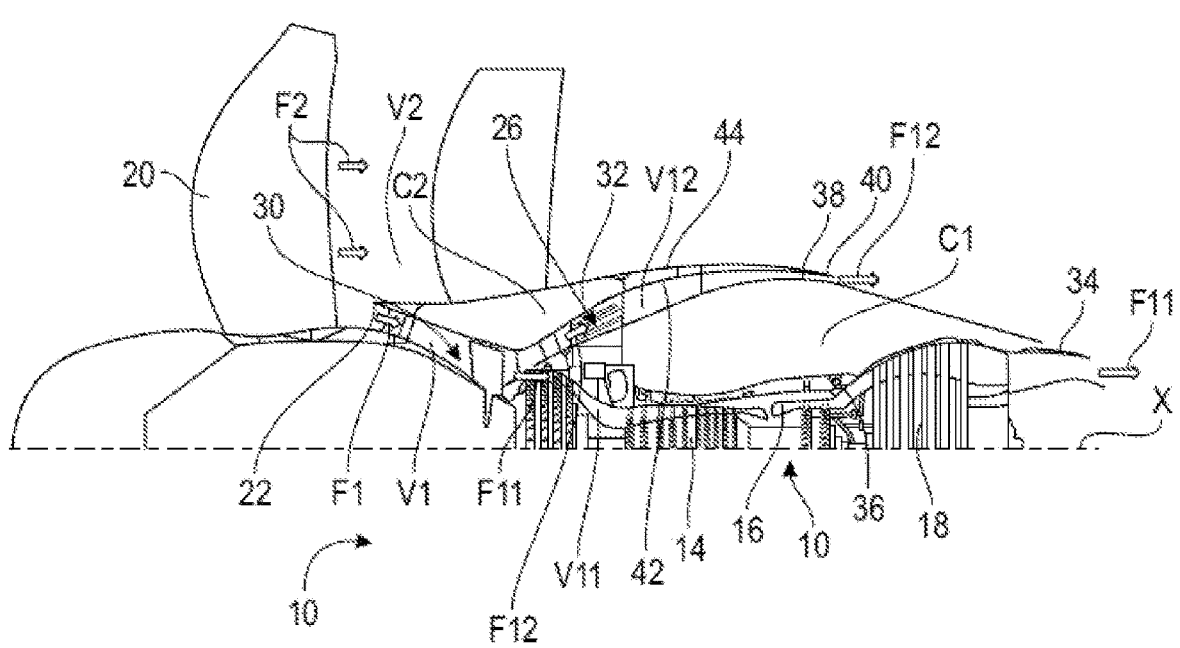

[Fig.3]
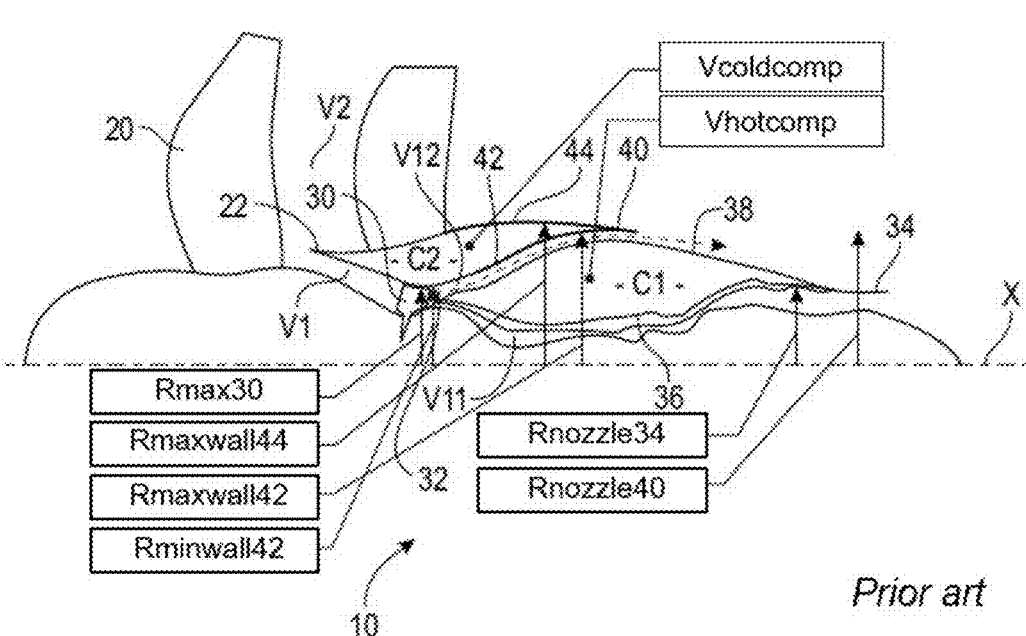
Prior art

[Fig.4]
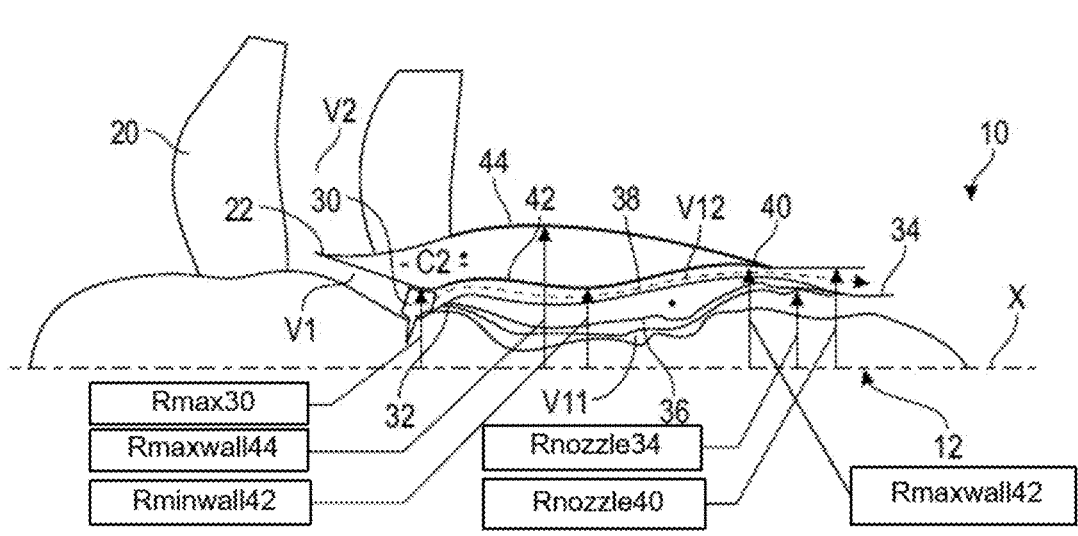

[Fig.5]
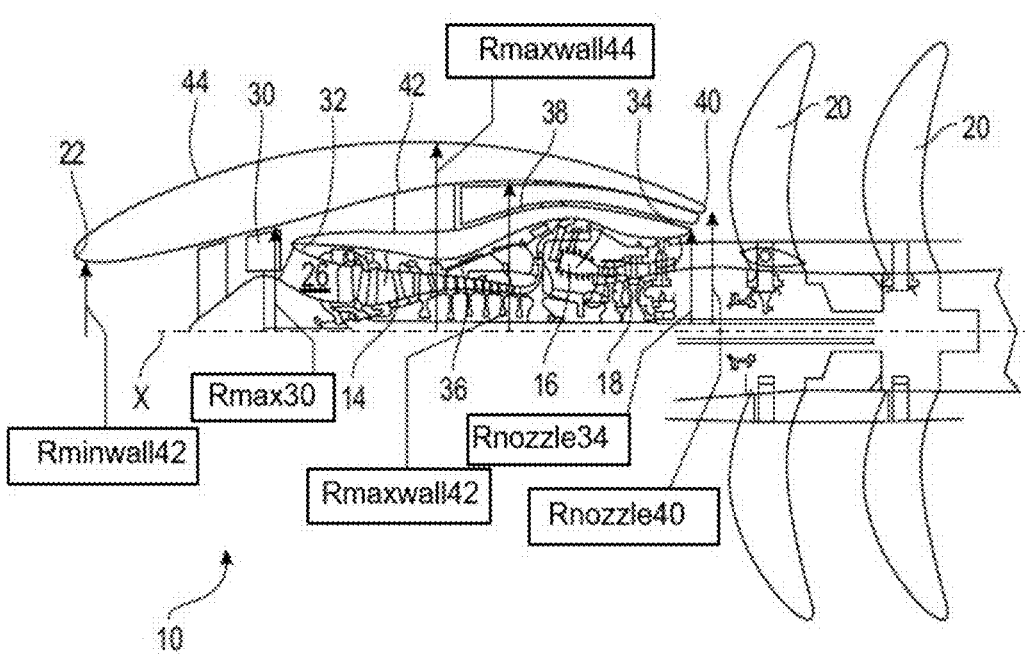

MULTIPLE-FLOW AIRCRAFT TURBINE ENGINE

CROSS-REFERENCE TO RELATED APPLICATIONS

This application is a National Stage of International Application No. PCT/FR2022/050720, filed Apr. 15, 2022, the entire disclosure of which is hereby incorporated by reference in its entirety for all purposes.

TECHNICAL FIELD OF THE INVENTION

The present invention relates to the field of multi-flow turbine engines, in particular for aircraft.

TECHNICAL BACKGROUND

The prior art includes in particular the documents FR3074476A1 and FR2981686A1, which relate in particular to turbine engines comprising at least one fan in the form of an unshrouded propeller. More particularly, these documents disclose turbine engines in which certain air flux ducts are suitable for improving the thermal management of the turbine engine, and in particular for cooling equipment or compartments that contain equipment.

As shown in FIG. 1, an aircraft turbine engine 10 generally comprises a gas generator 12 comprising at least one compressor 14, an annular combustion chamber 16 and at least one turbine 18.

The turbine engine 10 further comprises at least one propeller 20 which is driven by a shaft of the turbine 18.

The gas generator 12 comprises an annular splitter nose 22 for separating two annular ducts V1, V2 for the respective flow of an internal primary flux F1 inside the gas generator 12 and an external secondary flux F2 around the gas generator 12.

When the propeller 20 is located upstream of the gas generator 12 as in the example shown, it is called a fan and its purpose is to accelerate the air drawn in. A part of the air flux leaving the fan flows around the gas generator 12 to form the secondary flux F2 which generates most of the thrust produced by the turbine engine 10. The remainder of the air flux exiting the fan enters the gas generator 12 to form the primary flux F1. This air is compressed in the or each compressor 14, mixed with fuel and burned in said combustion chamber 16. The combustion gases are then expanded in said or each turbine 18 to drive in rotation the rotor of the turbine and thus the propeller 20.

The propeller 20 comprises blades 24 which generally have an angular position, called the pitch, which is fixed about an axis Y perpendicular to the longitudinal axis X of the turbine engine 10. Even in low engine speed phases, such as idling, this pitch is configured so that the flow rate of the secondary flux F2 generated is sufficient to feed fluid/air exchangers 26, whether or not they are surface-based, installed in the duct for the flow of the secondary flux F2. These exchangers 26 are necessary to cool the equipment of the turbine engine.

To improve engine performance (higher thrust and lower fuel consumption), some engine architectures aim to increase the bypass ratio (also called BPR), by increasing the diameter of the propeller 20. In order to limit the mass of the turbine engine 10, the shroud 28 located around the propeller 20 can be removed, and the blades 24 of the propeller 20 can be made steerable, and therefore with variable pitch, to control the thrust level of the turbine engine.

However, it happens that in certain phases such as ground idle, run-up or thrust reversal phases, the flow rate of the secondary flux F2 is no longer sufficiently high for the thermal management of the turbine engine which needs heat exchange between fluids and air in order to ensure the cooling of its equipment and its optimal operation. To address this problem, it has already been proposed to provide an additional bypass flux that is dedicated to the thermal management of the turbine engine.

As shown in FIG. 2, the turbine engine 10 comprises a secondary propeller 30 driven in rotation by a shaft of the gas generator 10. This propeller 30 is located in the duct V1 for the flow of the primary flux F1 and upstream of a second annular splitter nose 32 separating two annular ducts V11, V12 for the respective flow of a first internal flux F11 and a second external flux F12.

The exchangers 26 are housed in the duct V12 and are fed by the second external flux F12. The first internal flux F11 feeds the compressor 14, as mentioned above.

FIG. 2 shows that the gas generator 12 comprises two annular compartments C1, C2 which extend around the axis X.

The first annular compartment C1 is referred to as the hot compartment because it is relatively close to the duct V11 and therefore more exposed to the heat generated by the compression, by the combustion chamber 16 and by the combustion gases. This hot compartment C1 extends axially between the second splitter nose 32 and a first nozzle 34 for exhausting the first internal flux F11 from the turbine(s). This hot compartment C1 is also radially delimited by first and second annular walls 36, 38, respectively internal and external, which extend coaxially around each other. The first wall 36 defines externally the duct V11 for the flow of the first internal flux F11, and the second wall 38 defines internally the duct V12 for the flow of the second external flux F12.

The second annular compartment C2 is called the cold compartment because it is less exposed to heat, in particular because it is separated from the hot compartment by the duct V12. This cold compartment C2 extends axially between the first splitter nose 22 and a second nozzle 40 for exhausting the second external flux F12. This cold compartment C2 is also radially delimited by third and fourth annular walls 42, 44, respectively internal and external, which extend coaxially around each other. The third wall 42 defines externally the duct V12 for the flow of the second external flux F12, and the fourth wall 44 defines internally the duct V2 for the flow of the secondary flux F2.

A lot of the equipment of the turbine engine 10 is installed in the hot compartment C1, which is bulky. The cold compartment C2 is relatively small and is reserved for equipment that cannot withstand the temperatures of the hot compartment C1, in particular electronic equipment.

This type of installation has several consequences:

The equipment in the hot compartment C1 must be thermally protected. These thermal protections constitute additional volumes and masses to be installed in an already very constrained environment, which tends to hamper accessibility for inspections and maintenance of the turbine engine.

Localised ventilation must be added in the hot compartment C1 for certain equipment (particularly electronic equipment) that is more sensitive to heat and cannot be installed in the cold compartment C2 because space is too limited.

The equipment has a reduced service life in the hot compartment C1 and this restrictive environment has consequences for its design: the choice of technologies is limited and its mass is increased.

The invention provides a solution to all or part of these problems.

SUMMARY OF THE INVENTION

The invention relates to a multi-flow turbine engine for an aircraft, the turbine engine having a longitudinal axis and comprising:

a gas generator comprising at least one compressor, an annular combustion chamber, and at least one turbine, at least one main propeller driven in rotation by a shaft of the gas generator, the gas generator comprising:

a first annular splitter nose for separating two annular ducts for the respective flow of an internal primary flux inside the gas generator and an external secondary flux around the gas generator, a secondary propeller driven in rotation by a shaft of the gas generator, this propeller being located in the duct for the flow of the primary flux and upstream of a second annular splitter nose for separating two annular ducts for the respective flow of a first internal flux and a second external flux, a first nozzle for exhausting the first internal flux, a second nozzle for exhausting the second external flux, a first annular compartment, called the hot compartment, extending axially between the second splitter nose and the first nozzle, and between first and second annular walls, respectively internal and external, which extend coaxially around each other, the first wall externally defining said duct for the flow of the first internal flux, and said second wall internally defining said duct for the flow the second external flux, a second annular compartment, called the cold compartment, extending axially between the first splitter nose and the second nozzle, and between third and fourth annular walls, respectively internal and external, which extend coaxially around each other, the third wall externally defining said duct for the flow of the second external flux, and said fourth wall internally defining said duct for the flow of the secondary flux, characterised in that Rmaxwall42 is between 0.8.Rmax30 and 1.5.Rmax30, Rmaxwall44 is greater than or equal to 1.3.Rnozzle40, Rnozzle40 is between 1.2.Rnozzle34 and 1.5.Rnozzle34, and Vcoldcomp is greater than or equal to 1.3.Vhotcomp, with:

Rmaxwall42 which is the maximum radius of the third wall,

Rmax30 which is the maximum radius of the secondary propeller,

Rmaxwall44 which is the maximum radius of the fourth wall,

Rnozzle40 which is the radius of the second nozzle,

Rnozzle34 which is the radius of the first nozzle,

Vcoldcomp which is the volume of the cold compartment, and

Vhotcomp which is the volume of the hot compartment.

In the present application, the terms "upstream" and "downstream" refer to the direction of gas flow in the turbine engine.

The radii are measured with respect to the longitudinal axis of the turbine engine.

The invention thus proposes to optimise the geometrical characteristics of the turbine engine and in particular of the gas generator, to optimise the dimensions of its hot and cold compartments and to facilitate the integration of equipment, including heat-sensitive equipment, in these compartments. Advantageously, the cold compartment is longer and larger in diameter than a cold compartment of the prior art. Furthermore, this cold compartment is protected in the event of a fire by the duct for the flow of the second external flux, which also protects the cold compartment from thermal radiation linked to combustion.

The turbine engine according to the invention may comprise one or more of the following features, taken in isolation from each other, or in combination with each other:

Rminwall42 is between 0.8.Rmax30 and 1.5.Rmax30, with Rminwall42 which is the minimum radius of the third wall;

Rnozzle40 is between 1.95.Rmaxwall42 and 1.05.Rmaxwall42;

said at least one main propeller is located upstream of the gas generator;

said at least one main propeller is located downstream of the gas generator;

the turbine engine comprises two counter-rotating main propellers located downstream of the gas generator;

said at least one main propeller is unshrouded.

BRIEF DESCRIPTION OF THE FIGURES

Further features and advantages will be apparent from the following description of a non-limiting embodiment of the invention with reference to the attached drawings in which:

FIG. 1 is a schematic axial sectional view of a dual flow turbine engine for an aircraft, FIG. 2 is a schematic half-view in axial section of a dual flow turbine engine for an aircraft, which provides for an additional by-pass air flux for equipment cooling, FIG. 3 is a view similar to FIG. 2 and representing the prior art of the present invention, FIG. 4 is a view similar to FIG. 2 and representing an embodiment of the present invention, and FIG. 5 is a view similar to FIG. 2 and representing an alternative embodiment of the present invention.

DETAILED DESCRIPTION OF THE INVENTION

FIGS. 1 and 2 have been described above.

FIG. 3 shows an aircraft turbine engine 10 in the art prior to the present invention and which is similar to the turbine engine 10 of FIG. 2.

In the present application, several parameters are defined which are illustrated in FIG. 3, and which are:

Rminwall42: this is the minimum radius of the third wall 42,

Rmaxwall42: this is the maximum radius of the third wall 42,

Rmax30: this is the maximum radius of the secondary propeller 30,

Rmaxwall44: the maximum radius of the fourth wall 44,

Rnozzle40: this is the radius of the second nozzle 40,

Rnozzle34: the radius of the first nozzle 34,

Vcoldcomp: this is the volume of the cold compartment C2, and

Vhotcomp which is the volume of the hot compartment C1.

The radii are measured with respect to the longitudinal axis X of the turbine engine 10.

In the prior art shown in FIG. 3, the turbine engine 10 is such that:

Rmaxwall42 is greater than or equal to 1.6.Rmax30, Rnozzle40 is greater than or equal to 1.6. Rnozzle34, and Vcoldcomp is less than Vhotcomp.

FIG. 4 illustrates an embodiment of a turbine engine 10 according to the invention.

The foregoing description with reference to the preceding figures applies to FIG. 4 insofar as it does not contradict what follows.

The turbine engine 10 of FIG. 4 differs from the prior art in that:

Rmaxwall44 is greater than or equal to 1.3.Rnozzle40, Rmaxwall42 is between 0.8.Rmax30 and 1.5.Rmax30, Rnozzle40 is between 1.2.Rnozzle34 and 1.5.Rnozzle34, and Vcoldcomp is greater than or equal to 1.3.Vhotcomp.

Furthermore, in a preferential manner:

Rminwall42 is between 0.8.Rmax30 and 1.5.Rmax30, and/or

Rnozzle40 is between 1.95.Rmaxwall42 and 1.05.Rmaxwall42, i.e., the radius of the nozzle 40 is substantially equal to the maximum radius of the wall 42 (+/−5%).

As illustrated in FIG. 4, the propeller 20 may be located upstream of the gas generator 12.

In the embodiment shown in FIG. 5, the propeller 20 is located downstream of the gas generator 12. As illustrated, the turbine engine 10 may comprise a doublet of propeller downstream of the gas generator 12, namely for example two successive and counter-rotating main propellers 20.

The turbine engine 10 of FIG. 5 has the same geometrical characteristics (Rmaxwall42, Rmaxwall44, Rnozzle40, Vcoldcomp, etc.) as the turbine engine 10 of FIG. 4.

An advantage of the invention is to obtain a larger cold compartment C2 so as to be able to accommodate more equipment, whatever the dimensions of the turbine engine 10.

Another advantage is to have a cold compartment C2 protected from fire and thermal radiation by the duct V12 for the flow of the flux F12, which allows to increase the life of the equipment installed in this compartment C2 while optimising their design without very high temperature resistance constraints.

Moreover, from an aerodynamic point of view, the diameter of the duct V12 being relatively small compared to the previous technique, the radial dimension of the duct is larger for the same passage cross-section compared to the current technique, which facilitates the integration of the heat exchangers.

In addition, it is easier to control the mach in the duct V12 (the mach in the duct is directly linked to the passage cross-section). Indeed, with a larger diameter duct, a very small deviation in the radial dimension of the duct has a strong impact on the passage cross-section.

The invention claimed is:

1. A multi-flow turbine engine for an aircraft, the turbine engine having a longitudinal axis and comprising:

a gas generator having at least one compressor, an annular combustion chamber, and at least one turbine; and at least one main propeller driven in rotation by a shaft of the gas generator;

the gas generator further comprising:

a first annular splitter nose for separating two annular ducts for the respective flow of an internal primary flux inside the gas generator and an external secondary flux around the gas generator;

a secondary propeller driven in rotation by a shaft of the gas generator, the secondary propeller being located in the annular duct for the flow of the internal primary flux and upstream of a second annular splitter nose for separating two annular ducts for the respective flow of a first internal flux and a second external flux;

a first nozzle for exhausting the first internal flux;

a second nozzle for exhausting the second external flux;

a first annular compartment extending axially between the second annular splitter nose and the first nozzle and between first and second annular walls, respectively internal and external, which extend coaxially around each other, the first wall externally defining the annular duct for the flow of the first internal flux, and the second annular wall internally defining the annular duct for the flow of the second external flux; and a second annular compartment extending axially between the first splitter nose and the second nozzle, and between third and fourth annular walls, respectively internal and external, which extend coaxially around each other, the third annular wall externally defining the annular duct for the flow of the second external flux, and the fourth annular wall internally defining the annular duct for the flow of the external secondary flux, wherein:

Rmaxwall42 is between 0.8.Rmax30 and 1.5.Rmax30,

Rmaxwall44 is greater than or equal to 1.3.Rnozzle40,

Rnozzle40 is between 1.2.Rnozzle34 and 1.5.Rnozzle34, and

Vcoldcomp is greater than or equal to 1.3.Vhotcomp, with:

Rmaxwall42 being the maximum radius of the third wall,

Rmax30 being the maximum radius of the secondary propeller,

Rmaxwall44 being the maximum radius of the fourth wall,

Rnozzle40 being the radius of the second nozzle,

Rnozzle34 being the radius of the first nozzle,

Vcoldcomp being the volume of the second annular compartment, and

Vhotcomp being the volume of the first annular compartment.

2. The turbine engine according to claim 1, wherein Rminwall42 is between 0.8.Rmax30 and 1.5.Rmax30, with Rminwall42 being the minimum radius of the third wall.

3. The turbine engine according to claim 1, wherein Rnozzle40 is between 1.95.Rmaxwall42 and 1.05.Rmaxwall42.

4. The turbine engine according to claim 1, wherein the at least one main propeller is located upstream of the gas generator.

5. The turbine engine according to claim 1, wherein the at least one main propeller is located downstream of the gas generator.

6. The turbine engine according to claim 5, further comprising two counter-rotating main propellers and located downstream of the gas generator.

7. The turbine engine according to claim 1, wherein the at least one main propeller is unshrouded.

* * * * *